United States Patent [19]
Jeffryes

[11] Patent Number: 6,166,994
[45] Date of Patent: Dec. 26, 2000

[54] SEISMIC DETECTION APPARATUS AND METHOD

[75] Inventor: Benjamin Peter Jeffryes, Champaign, Ill.

[73] Assignee: Schlumberger Technology Corporation, Sugar Land, Tex.

[21] Appl. No.: 09/226,345

[22] Filed: Jan. 6, 1999

[30] Foreign Application Priority Data

Jan. 7, 1998 [GB] United Kingdom .................. 9800142

[51] Int. Cl.⁷ ...................................... G01V 1/40
[52] U.S. Cl. .................... 367/57; 367/73; 175/45
[58] Field of Search .................... 702/9, 14; 367/25, 367/32, 27, 57, 73; 181/102

[56] References Cited

U.S. PATENT DOCUMENTS

| | | | |
|---|---|---|---|
| 5,678,643 | 10/1997 | Robbins et al. | 175/45 |
| 5,679,894 | 10/1997 | Kruger et al. | 73/152.03 |
| 5,831,934 | 11/1998 | Gill et al. | 367/25 |
| 5,842,149 | 11/1998 | Harrell et al. | 702/9 |

FOREIGN PATENT DOCUMENTS

0795764  9/1997  European Pat. Off. .

*Primary Examiner*—Jay Patidar
*Assistant Examiner*—Victor J. Taylor
*Attorney, Agent, or Firm*—William L. Wang; Brigitte L. Jeffery

[57] ABSTRACT

A method of seismic exploration while drilling from within a borehole containing fluid, with a source and receivers positioned in the borehole is provided, comprising detecting small amplitude signals from waves within the fluid. The method is used to identify signals from waves within the fluid known as tube waves that result from compressional waves converted at the bottom of the borehole. The invention also includes seismic detection apparatus comprising ring hydrophones or similar pressure sensors. The apparatus is preferably attached to a coiled tubing with the drill bit actuated by a separate actuator as source.

18 Claims, 4 Drawing Sheets

SEISMIC DETECTION APPARATUS AND METHOD

BACKGROUND OF THE INVENTION

1. Field of the Invention

This invention relates to seismic detection apparatus and to a method of seismic exploration while drilling.

2. Description of the Related Art

In conventional seismic detection, a seismic source signal is reflected from different rock substrates or strata within the earth, so producing compressional waves and shear waves which can be analyzed to determine the direction and extent of geological features in strata.

It is possible to use a drill bit to produce a seismic source signal during drilling and techniques of analyzing these signals to produce information on rock formations have been investigated. The basic principle of seismic while drilling technology includes a working drill bit that destroys the rock at the bottom of a borehole, thereby radiating acoustic energy into surrounding geological formations. Some of this energy travels directly to the surface where it can be detected by geophones, or by hydrophones if the well is offshore. Some of the energy radiates downwards ahead of the bit where it may be reflected by impedance contrasts in the earth. This reflected energy is also detected at the surface. However in certain drilling conditions, for example when drilling horizontal wells, using standard seismic while drilling techniques is difficult as acoustic reflections from the substrates are not reflected towards the surface. A look-ahead method within the context of a measurement while drilling tool is described for example in U.S. Pat. No. 5,678,643. A VSP based look-ahead method within the context of a measurement while drilling tool is described for example in EP-A-0795764.

The present invention aims to provide apparatus and an associated processing method that enable collection and analysis of borehole seismic measurements while drilling, in particular, for coiled tubing systems and in the drilling of horizontal wells.

SUMMARY OF THE INVENTION

According to a first aspect of the invention, a method of exploring a subterranean formation ahead of a drill bit penetrating the formation is provided. A bottom hole assembly is lowered into a borehole filed with a fluid. The assembly includes a drill bit, a source of acoustic energy and a plurality of receivers sensitive to acoustic energy. While operating the drill bit, acoustic energy is emitted from the source into the fluid and the formation, thereby generating a primary compressional wave travelling within the fluid and secondary compressional waves travelling within the fluid, which are converted into compressional waves at the bottom end of the borehole from acoustic energy reflected from within the formation. The primary compressional waves are detected. Information derived from detected primary compressional waves is used to detect the secondary compressional waves. The detected secondary compressional waves are then evaluated to obtain features of the formation ahead of the drill bit.

According to a further aspect of the present invention, there is provided a method of seismic exploration while drilling from within a borehole containing fluid, with a source and receivers positioned in the borehole, comprising estimating the velocity of waves within the fluid to produce a velocity estimate; using noise signals within seismic signals received in the borehole to refine the velocity estimate so as to produce a refined value of the velocity; and using the refined value to identify small amplitude signals from waves within the fluid.

The small amplitude signals preferably represent compressional waves converted at one end of the borehole into waves within the fluid, the compressional waves being reflected from formations external of the borehole before conversion into waves within the fluid.

The waves within the fluid are preferably tube waves which are hydraulic waves that travel at low frequencies down fluid filled boreholes. The definition of 'low' is that the circumference of the borehole is small compared to one wavelength of acoustic waves in the free fluid. Across cross sections of the borehole, the pressure distribution is approximately constant. At sufficiently low frequencies, tube waves are the only mode of acoustic propagation that is predominantly through the fluid.

As the frequency approaches zero, the velocity of the tube wave c in the annulus surrounding a drillstring, itself surrounded by rock, is given by:

$$\frac{1}{c} = \sqrt{\frac{1}{c_0^2} + \frac{r^2}{r^2 - a^2} \frac{\rho}{\mu}} \quad [1]$$

where $c_0$ is the compressional wave velocity in the free fluid, $\rho$ is the fluid density, $\mu$ is the shear modulus of the surrounding rock, r is the borehole radius and a is the radius of the drillstring.

At higher frequencies (i.e. not 'low' according to the above definition) there may be more than one predominantly fluid-borne mode of acoustic propagation. The tube wave will normally be considered to be that mode where for a monochromatic wave, moving in one direction along the borehole, the pressure distribution across a cross-section of the borehole at one time is everywhere of the same sign. The speed of the mode will also be quite close to that given in equation [1].

Preferably the noise signals used to refine the velocity estimate are from a direct wave within the fluid occurring at approximately zero-offset, this wave preferably being a direct tube wave.

The invention also includes as a further aspect, a method of seismic analysis of data signals from within a borehole containing fluid, comprising identifying signals resulting from compressional waves converted at a well head to a wave within the fluid.

Desirably the identified signals lag the direct wave arrival by the two-way travel time for a compressional wave to travel from a drill bit in the borehole to a reflector within the earth and to return to the well head. Generally, the detected signals are expected to have a speed within the borehole of less than 2000 m/s, most likely in the order of 1000 m/s.

The presence of up and down going waves within the borehole may also be identified, a prediction filter calculated, the prediction filter used to remove unwanted signals from the data signals, and move-out analysis performed.

By identifying the up and down going waves, tube waves within the borehole can be clearly identified, and their components due to reflected seismic signals of interest identified.

In general the up and down going waves identified are axial waves and tube waves. The prediction filter is preferably calculated from the axial waves and a direct tube wave from within the borehole.

Data signals may be combined with beamforming in order to separate the up and down going waves. In addition a preferred step includes conducting correlation and/or stacking of the data signals downhole to reduce the quantity of data to be transmitted to surface. Sampling of the data signals may also be performed to reduce the data rate of the signals to be transmitted to surface. A preferred bandwidth of the receiver is 800 Hz and a sampling level of 2K samples/second/sensor.

Move-out analysis, i.e., time-shifting the signals so that reflections from a common reflector occur at the same time, is preferably carried out by combining the rate of penetration of the drill bit with a measured compressional wave speed. This improves the signal to noise ratio.

Where the seismic source is a continuous wave source, the method preferably also include the use of up-sweep to remove noise.

A further aspect of the invention is a method of look-ahead sonar using any combination of the above described methods.

There is also provided as another aspect of the present invention, an apparatus for exploring a subterranean formation ahead of a drill bit penetrating the formation. The apparatus includes a source of acoustic energy to emit acoustic energy while drilling, and receivers to detect compressional waves propagating through fluid within the borehole while drilling. A signal processing filter uses information derived from a primary compressional wave propagating through the fluid to identify secondary compressional waves propagating through the fluid which are characteristic of the formation ahead of the drill bit.

Preferably, said apparatus comprises refining means using noise signals within the data signals to refine the velocity estimate to produce a refined value of the velocity, and a first identification means for identifying small amplitude signals from waves within the fluid by using the refined value.

With such apparatus preferably the first identification means identifies signals resulting from reflected compressional waves converted at a well bottom to a wave within the fluid.

Additionally a second identification means is preferably be provided to identify the presence of up and down going waves within the borehole, calculation means to calculate a prediction filter and to use the prediction filter to remove unwanted signals from the data signals, and analysis means for performing move-out analysis.

Combination means for combining the data signals with beam-forming may also be provided.

According to a further aspect of the present invention, there is provided an apparatus comprising a support to which a drill bit is releasably attached, a wave source attached proximal to the drill bit, and a plurality of receivers at spaced apart locations along the support so as to form a logarithmic array.

Preferably the support is a tubular drillstring, and may more preferably be provided with coiled tubing. This allows direct connection of the drill bit, wave source and receivers to a remote location, normally at the surface, from where drilling is being controlled. Connection to the surface can be established by wireline, thus producing a low noise and a high data rate connection to the surface. Other means of exchanging signals between the seismic detection apparatus and the surface include mud-pulse telemetry and drillstring telemetry. The latter two methods suffer currently from a low transmission rate and thus are preferable combined with methods of compressing the data or means of downhole processing as described above.

The support preferably also include a bottom hole assembly to which the drill bit is releasably attached.

The present invention provides a look-ahead seismic analysis apparatus which can be used in any sort of well, but which is of particular advantage when used in non-vertical or horizontal wells where the well geometry disrupts seismic reflections and reduces their surface incidence.

The wave source is preferably be provided by an impulsive source, such as a mechanical impulsive source powered by differential mud pressure. The use of an impulsive source is of advantage as it has an independent power supply and does not need direct power connection to the surface via the support. However the wave source is preferably a continuous wave (CW) source, which, is of advantage as the frequency content of the source signal can be controlled to ensure that the signal produces a range of frequencies, i.e. a sweep, whilst maintaining a smooth spectrum. This assists with signal processing when finding acoustic reflections amongst the background noise associated with the drill bit.

The receivers are typically pressure sensors such as hydrophones and provide sampling over the entire wave number spectrum of the wave source. Preferably each of the receivers averages a received signal over the circumference of the drillstring to reduce asymmetric effects within the borehole. Typical examples for such receivers are known as ring hydrophones.

To assist with processing of the signals received by the receivers, an axial accelerometer is preferably be provided. This allows measurement of the rate of penetration of the drill bit and assists with move-out analysis.

The above-described methods are for use with the above mentioned seismic detection apparatus.

These and other features of the invention, preferred embodiments and variants thereof, and further advantages of the invention will become appreciated and understood by those skilled in the art from the detailed description and drawings following below.

DESCRIPTION OF THE PREFERRED EMBODIMENT

The provision of a seismic detection apparatus to allow one to look ahead of the drill bit during drilling is often difficult. For example problems occur with near-vertical exploration wells when looking for impedance changes ahead of the bit and also with horizontal wells where fractures ahead of the bit back-scatter energy and do not reflect seismic energy towards the surface. The signal to noise ratio when using seismic detection in such wells is low and the processing of seismic signals to provide useful substrate information is rendered difficult. The present invention thus provides a downhole seismic source and receiver, using an acoustic source and receivers to look ahead of the bit. This downhole source and receiver combination can be thought of as "borehole sonar" with the acoustic source being located as close to the end of the borehole as possible and with the receivers placed along a bottom hole assembly (BHA).

Figure 1:
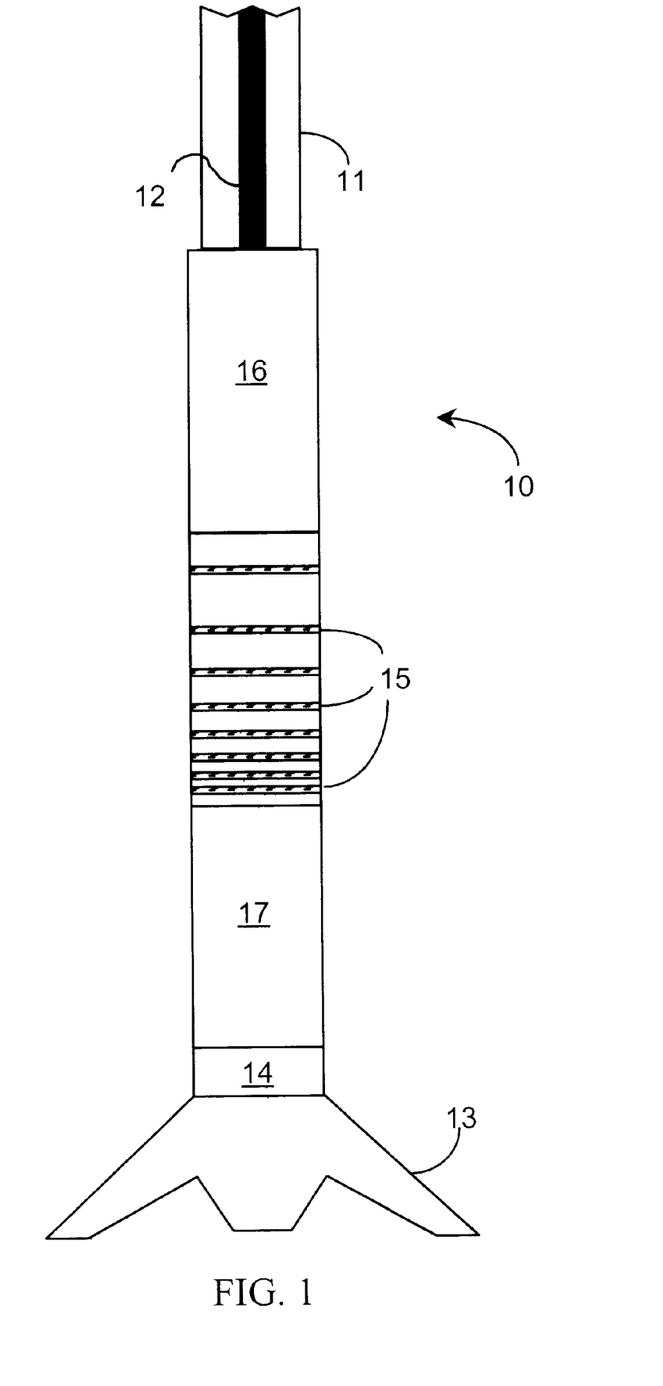
FIG. 1 shows a schematic example of a detection apparatus in accordance with the present invention.

In FIG. 1, an embodiment of the invention is shown consisting of a BHA 10, mounted on coiled tubing 11 and connected electrically to the surface in such a way as to allow the transmission of electrical energy from surface to downhole, and to allow the transmission of data in both directions, and a processing scheme to find the reflected energy signal in the up-going tube-wave in a borehole. The connection to surface by wireline 12 within the coiled tubing 11 provides a high data-rate connection to the surface, and a surface power supply. This wireline connection also allows the transmission of electrical energy from surface to downhole, and the transmission of data in both directions.

A drill bit 13 mounted at the bottom end of the BHA 10 may be turned either by the action of the mud (turbine or Positive-Displacement-Motor), or by electrical power, or by a combination of the two. Above the drill bit 13 are placed electrical actuators 14, magneto-strictive or piezo-electric for example, that are electrically driven. The actuators of this example are optimized for continuous operation.

Along the BHA is mounted an array of ring hydrophones 15, whose spacing is determined by the need to accurately measure the acoustic signal traveling up and down the borehole predominantly in the fluid (tube waves), and to discriminate against waves traveling up and down the metal of the drillstring (drillstring waves), at the frequencies of operation of the actuator 14.

An example of hydrophone positions using 8 hydrophones is 0, 0.15, 0.40, 0.81, 1.48, 2.60, 4.45 and 7.50 meters (relative distance). In another example using 16 hydrophones the relative locations are 0, 0.15, 0.32, 0.52, 0.76, 1.02, 1.33, 1.69, 2.10, 2.58, 3.14, 3.78, 4.51, 5.37, 6.36 and 7.50. The use of more hydrophones permits better discrimination between different modes of propagation. A regular array of hydrophones is also possible, for instance 16 hydrophones with 0.22 m spacing.

One or more axial accelerometers (not shown) are used to provide an estimate of the rate-of-penetration of the drill bit by integration of the measured acceleration.

During operation, the electrical actuators 14 provide the seismic source signal and are optimized for continuous operation, transmitting the same signal into the surrounding rock at regular intervals. The continuous wave source provided by each such actuator produces a wave with a low power output but a long duration, and with a controllable bandwidth so that the wave signal can occupy the full bandwidth of interest and provide a smooth frequency spectrum. The signal can be a linear up-sweep signal which minimizes effects due to harmonic signal distortion or any signal whose auto-correlation is a band-limited spike.

Alternatively a mechanical impulsive actuator can be used to deliver signals with high instantaneous power. For this type of signal source, there is no way of controlling the frequency content of the signal, and in order to stack data from the hydrophones successfully during the processing stage, an independent source signature measurement is required.

The actuator 14 desirably operates at a frequency where there is not significant intrinsic attenuation of compressional waves in the surrounding substrate, and since resolution increases with bandwidth, as high a frequency as possible should be used. The chosen operating range of the actuator therefore varies depending on the surrounding rock substrate. In slow attenuative environments such as shales with a 2500 m/s compressional wave speed, high frequencies will not penetrate, giving an operating bandwidth of operation of 500–1000 Hz. For hard limestone, with little attenuation and with a 5000 m/s compressional wave speed, a bandwidth of 1000Hz is needed to give the same resolution as for shales and the operating range of the transmitter is then 1000–2000Hz.

The center frequency and the frequency range of the signal from the actuator 14 can be changed via a control channel. This allows data acquisition to be adapted to the surrounding substrates, so for slow rocks with a high ROP and with high attenuation, a relatively low frequency is used. This avoids stacking out the signal and reduces attenuation, whilst still achieving adequate resolution. In fast rocks with a slow ROP then a higher frequency is used, taking advantage of better signal efficiency, whilst still achieving the same spatial resolution.

Figure 2:
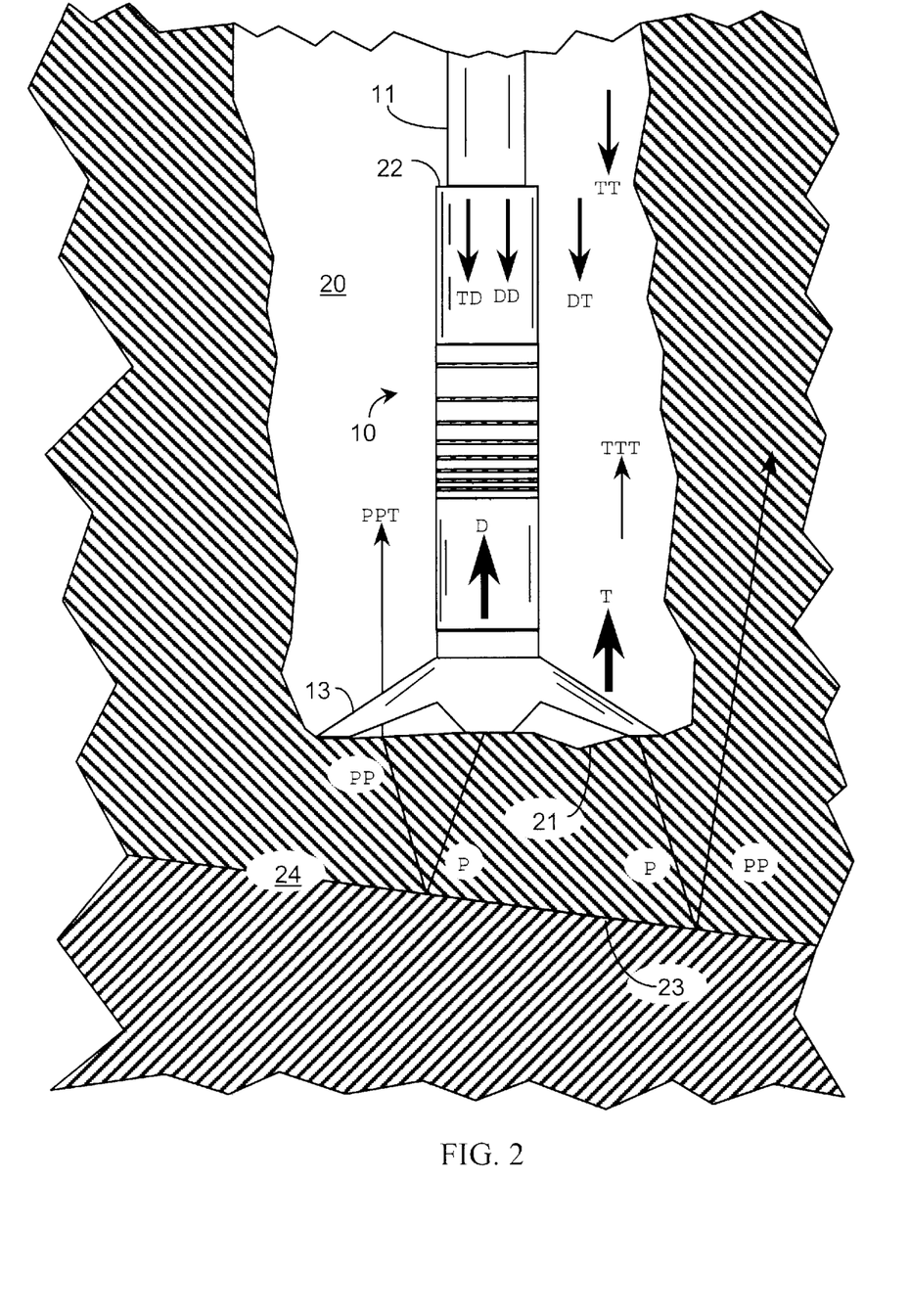
FIG. 2 shows a schematic view of seismic signals occurring in a borehole.

The different waves within a fluid filled borehole 20 and the surrounding substrate 21 are shown schematically in FIG. 2, assuming the only source of wave energy in the borehole is the drill bit. The BHA 10 of FIG. 1 is shown located at the bottom of the borehole.

Usually, there will be at least four different waves received at the hydrophones, corresponding to tube waves up and down the borehole and axial waves up and down the borehole and the drillstring 11. There may also be additional head waves generated in the fluid as the compressional wave passes by the borehole walls. These waves will have a variety of wavelengths, since the axial modes move at approximately 5000 m/s, and the tube waves at approximately 100 m/s. The speed of the tube wave is related to the shear modulus of the surrounding rock, its speed decreasing as the shear modulus of the surrounding rock decreases.

At low frequencies of seismic source signal, there will be an axial drillstem wave, (propagating at approximately 5000 m/s), and a direct tube wave, and these waves will reverberate in the borehole 20 and the drillstring 11, so as to produce a series of tube waves and axial waves. Further the source signal is reflected from the surrounding substrate as compressional and shear waves which add to the amplitude of the tube waves in the drilling fluid. There will be several signals associated with each acoustic reflection, the most important of which are the tube wave and the head wave.

Waves traveling through the drillstring are generally designated 'D', with waves traveling through the fluid filled wellbore generally designated 'T'. The letter 'P' represents compressional waves that travel through the geological formations surrounding the wellbore. Combinations of these letters denote the reflection path of a wave before it is detected at the hydrophones, for example 'TT' represents a wave that originated as an upwards moving tube wave and then was reflected as a downgoing tube wave, with 'DT' representing a wave that traveled up the drillstring 11 and was then reflected back down the borehole 20 as a tube wave.

The first arrival at the hydrophones is labeled 'D' for drillstring. This has come up the drillstring as an axial wave. Where there is a reflection point 22 above the hydrophone array, some of this drillstring wave is reflected back as 'DD', a drillstring wave with the same moveout as 'D' but in the opposite direction. Some of the drillstring wave is converted to a downgoing tube wave 'DT'. This is a much slower moving wave, and hence has much greater moveout across the array. Overlapping with 'DT' is the main tube wave arrival 'T'. This is the direct tube wave signal coming from the bit 13. Some of this is reflected back down as a drillstring wave ('TD'), and some as a downgoing tube wave ('TT').

All of the above arrivals are noise, and contain no lithological reflections. The arrival labeled 'PP' is the compressional, or P wave, signal where a compressional wave has gone from the bit, been reflected at a reflector 23 in front of the bit 13 and is moving through the rock 24.

Although the wave is rock born, the conversion of the wave at the bottom of the borehole allows the hydrophones to pick up a pressure signal: Arrival 'PPT' results from where the wave has left the bit 13 as a P wave, been reflected below the bit from the reflector 23 as a P wave, and converted to a tube wave at the bottom 21 of the borehole. The signal is moving past the hydrophones at the speed of a tube wave, and the time difference between the main tube wave 'T' and subsidiary tube wave 'PPT' is the two-way travel time for a P wave from the bit to the reflector 23.

Arrival 'TTT' shows tube wave energy that has come from the bit 13 as a tube wave, been reflected above the hydrophones, and then been re-reflected from the hole bottom 21.

The various wave arrivals cause changes in pressure at the hydrophones responding by producing a signal. If the raw signal is sampled using 16 bit sampling and a 2 kHz sampling rate (Nyquist), the data rate is 32 kbits/second/ receiver. It is this signal which is transmitted to the surface along the wireline 12 and then analyzed, as described later.

Some processing of the data may be carried out downhole, for example correlation and stacking, if the wireline cannot carry the required data rate. Thus if the data is cross-correlated with the actuator signal, stacked to one waveform/second and time-windowed to the listening time, the data rate can be reduced to 1 kbit/second/receiver. The advantage of processing the data signals with relation to the tube wave is that the tube wave velocity across the array is generally constant and is probably higher in amplitude than the head wave. The advantage of processing with relation to the head wave is that the head wave gives a direct measurement of the compressional wave speed of the formation. If however this speed is close to that of the axial waves in the drillstring (such as in hard limestones) then this measurement will normally be impossible.

The direct tube wave and axial wave invariably have a larger amplitude than the waves reflected by formations in the surrounding rock substrates. Typically when using the source to look ahead into the surrounding strata by 30 m, the direct tube wave 'T' created by the actuator is likely to be 10000 times greater than a component of the tube wave due to a reflection.

Once the raw data, including background noise and reflected acoustic signals of interest, is available, processing of this pre-stack data is needed to acquire and process the signals relating to the tube wave and to detect acoustic reflections contained in the tube wave.

Figure 3:
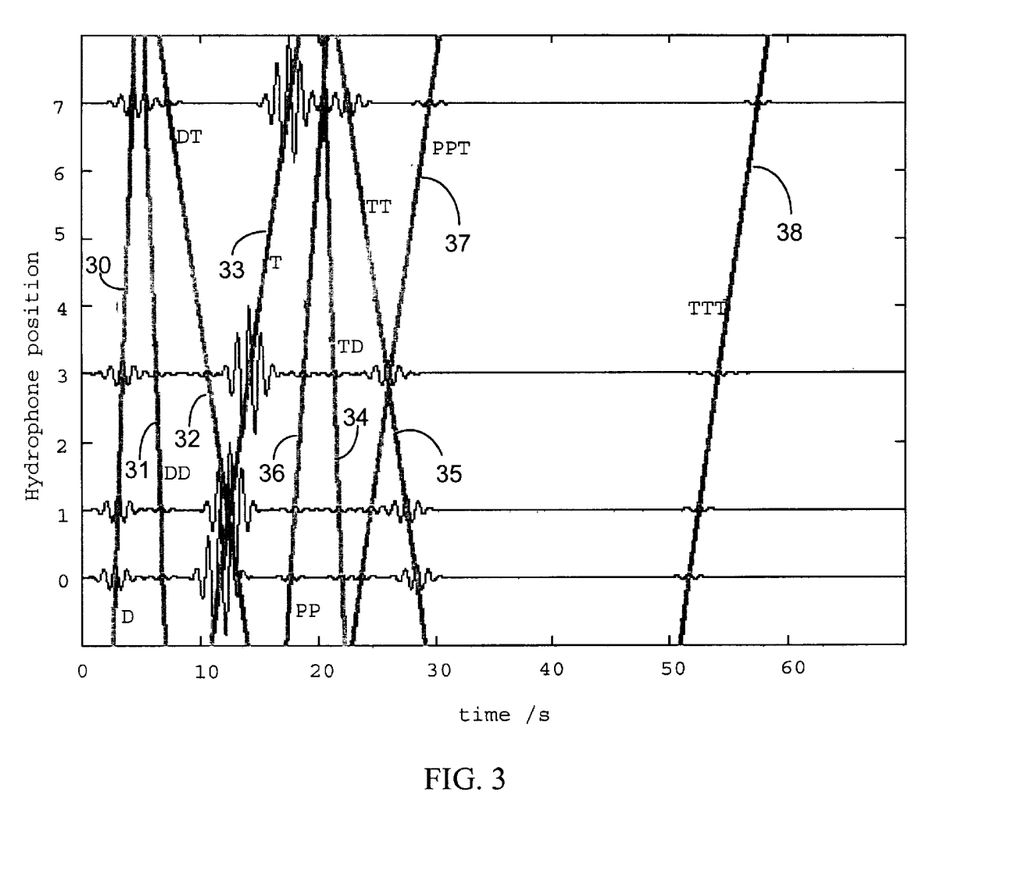
FIG. 3 shows an illustrative view of seismic signals in the borehole when considering arrival time against hydrophone position.

In FIG. 3, an illustrative example of the signal received at four ring hydrophones positioned at relative locations along the array of 0, 1, 3, and 7 meters is shown. For simplicity, the different arrivals shown are generated by an impulsive source. The different arrivals are shown with a size illustrative of their real amplitudes, but these data are purely synthetic and not intended to be realistic.

Each hydrophone trace shows the seismic signals received at the hydrophone over time, with the moveout of each wave across the array of hydrophones shown by a thick line.

The first arrival at the hydrophones is that of the drillstring axial wave 'D' of moveout 30. The moveout 31 of the reflected drillstring wave 'DD' is the same as the moveout 30 of 'D', but in the opposite direction.

The downgoing tube wave 'DT' is a much slower moving wave than the axial waves 'D' and 'DD' and hence has much greater moveout 32 across the array. Overlapping with 'DT' is the main tube wave arrival 'T' 33, with some of this direct tube wave being reflected back down as a drillstring wave 'TD' 34, and some as a downgoing tube wave 'TT' 35.

The moveouts 36, 37 related to the compressional wave 'PP' and converted compressional wave 'PPT', respectively, are different, as 'PPT' has been converted to a tube wave at the bottom of the borehole and is moving past the hydrophones at the slower speed of a tube wave. The time difference between 'T' and 'PPT' is the two-way travel time for a P wave from the bit to the reflector.

Arrival 'TTT' 38 is tube wave energy that has come from the bit as a tube wave, been reflected above the hydrophones, and then been re-reflected from the hole bottom. This is moving past the hydrophones at the same speed as the signal of interest 'PPT', and so 'TTT' cannot be distinguished from 'PPT' by beam-forming or other move-out based methods. However, the energy in the arrival 'TTT' has already passed the array moving downwards, and so some of it can be removed by finding a prediction filter for the upgoing tube wave energy based on the downgoing tube wave energy. In order to avoid this filter canceling the 'PPT' signal of interest, it is best to calculate the prediction filter from the signals before correlation and stacking, so as to include as much bit noise within the filter as possible.

It is difficult to isolate the 'PPT' arrivals as they are of small amplitude and conventional processing will fail to find these arrivals. However the tube wave velocity can be estimated because it varies little between different boreholes as the tube wave velocity is largely due to the properties of the fluid in the borehole. This velocity estimate is used to identify the large noise signals 'T'. Once the large noise events have been identified, the estimated tube wave velocity can be refined to a value representing the true tube wave velocity in that particular borehole.

With an accurate tube wave velocity, the small 'PPT' arrivals, which would otherwise be rejected as insignificant, can be focused on and the subsequent processing conducted on these identified 'PPT' signals.

Processing, of signals received at the hydrophones is as follows, with the aim of the processing being to isolate up-going tube waves 'PPT' that have been generated by compression waves which originated at the bit, were then reflected from structures in the rock ahead of the bit, and then converted at the end of the borehole to up-going tube waves in the borehole. Processing the signal to find the acoustic reflections amongst the background noise is aided by a smooth spectrum produced by a continuous wave source. The waveforms in the data are processed into up and down going acoustic waves, with compressional components. Preliminary correlation and stacking of the data may be performed downhole to produce a reduced data rate that can be transmitted to surface along the wireline.

The signals from the individual hydrophones are then combined using beam-forming into estimates of the up and down going tube-waves and up and down going axial waves crossing the sensor array. The velocity of the tube wave is estimated from empirical data previously acquired. By using the large arrival signal of the up-going tube wave directly generated by the actuator (signal 'T' 33), the velocity of the tube wave can be further refined to a true velocity within the particular borehole from which data has been acquired. The drillstring wave amplitude, or axial wave amplitude, will generally be smaller (due to much lower coupling between a ring hydrophone and the stress wave in the steel of the BHA), but the drillstring wave velocity varies very little in different borehole environments, and so its velocity can be estimated with a high degree of accuracy.

After the determination of the velocities of the up-going tube wave 'T' and the drillstring wave 'D', the signal is amplified by beam-steering to look at waves moving up the borehole at the speed of the tube wave. However there will also be noise related to these waves, such as 'DT' and 'TT'. Unlike the direct tube wave 'T' from the transmitter, which appears at or near zero-time, these tube waves will be at similar times to the acoustic events of interest, i.e., the 'PPT' events. However by beam-steering the array to tube waves moving down the borehole, these events can be identified before they reflect from the bottom of the borehole. By isolating both upward and downward moving waves, a prediction filter is calculated that removes upward moving waves that have previously come down the borehole.

This filter is then applied to the up-going wave data to remove from the signal components due to borehole reflections, caused from the reverberation of the direct tube wave and axial wave in the borehole. In this way upward moving waves derived from waves that have previously come down the borehole can be removed.

Some of the reflections that occur can also be accounted for using predictive deconvolution methods to estimate the shape of the actual up-going tube wave 'wavelet'.

The axial accelerometer is filtered down to a very low frequency and is time-integrated up to give rate of penetration (ROP) downhole. The measured ROP of the drill bit is combined with the best available measurement of compressional wave speeds in the rock to further improve the signal to noise ratio by conducting move-out analysis. This time-shifts the signals so that reflections from a common reflector in the rock occur at the same time. Events due to features in the borehole or the drillstring will now occur at different times to the reflected signals of interest. Applying non-linear filtering techniques such as median filtering will further enhance the reflection signal.

The advantage of move-out analysis is that it reinforces events directly in front of the bit. The disadvantage is that events at a wide angle to the bit will be attenuated. Using images from a long time interval, the lateral coverage may be usable to find not just the distance to a target, but the angle as well. To obtain a motion corrected image the data will need to be migrated. For this the position of the source and receivers needs to be known, so the axial accelerometer is combined with a surface depth measurement to obtain the best estimate of bit position against time.

With the method described above, identification of the 'PPT' wave signal is enabled, allowing look-ahead sonar for horizontal and near-horizontal wells. This allows flow fractures in horizontal wells in hard limestones to be identified, and analysis of the 'PPT' signal can be used to steer the drill bit while drilling.

Figure 4:
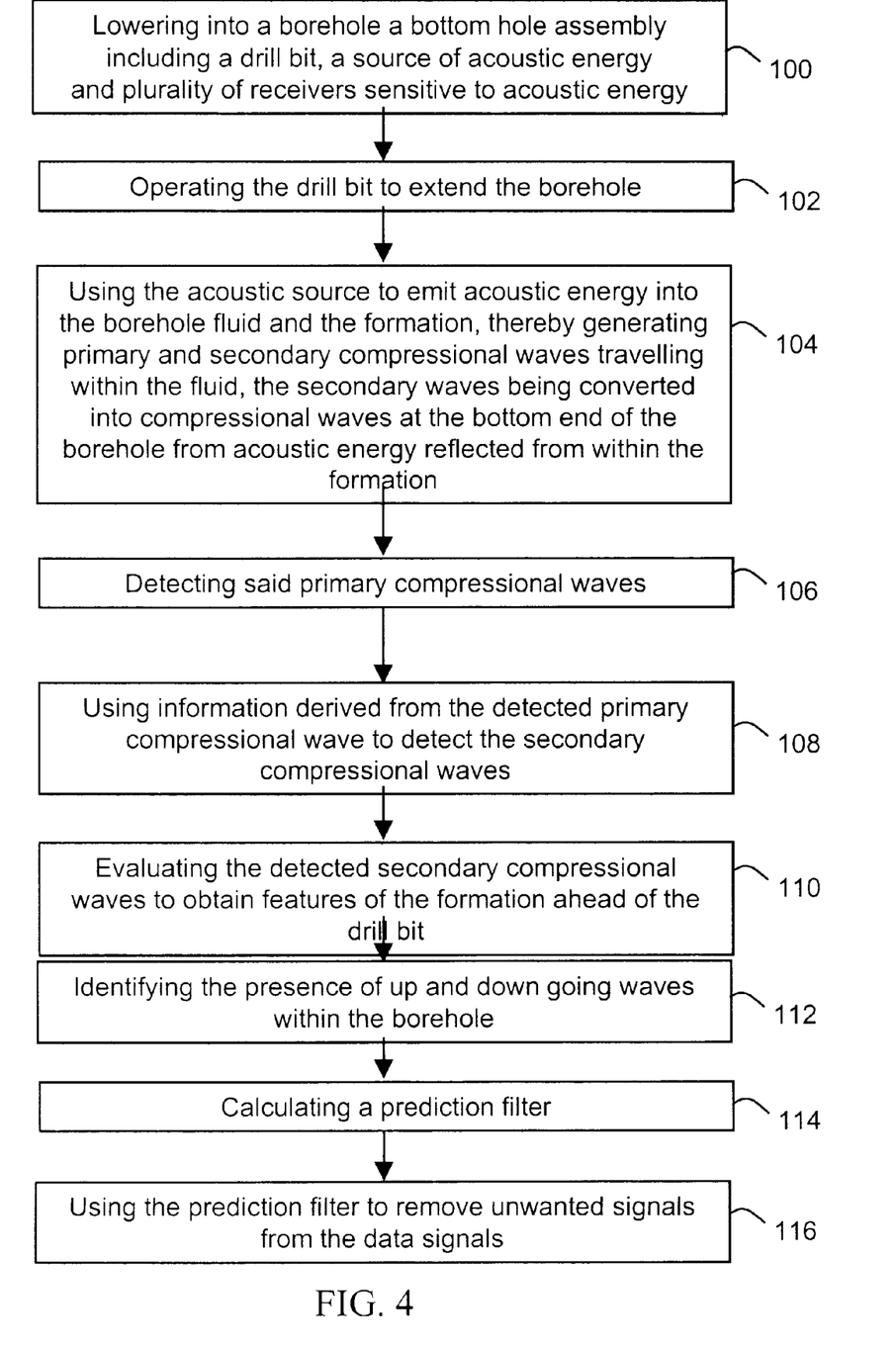
FIG. 4 is a flow chart showing a preferred embodiment of the invention.

FIG. 4 is a flow chart showing a preferred embodiment of the invention. Step 100 involves lowering a bottom hole assembly into a borehole filled with fluid, the assembly comprising a drill bit, a source of acoustic energy and a plurality of receivers sensitive to acoustic energy. Step 102 involves operating the drill bit to extend the borehole. Step 104 involves using the acoustic source to emit acoustic energy into the borehole fluid and the formation, thereby generating a primary compressional wave travelling within the fluid and secondary compressional waves travelling within the fluid, the secondary waves being converted into compressional waves at the bottom end of the borehole from acoustic energy reflected from within the formation. Step 106 involves detecting the primary compressional waves. Step 108 involves using information derived from the detected primary compressional wave to detect the secondary compressional waves. Step 110 involves evaluating the detected secondary compressional waves to obtain features of the formation ahead of the drill bit. Step 110 involves evaluating the detected secondary compressional waves to obtain features of the formation ahead of the drill bit. Step 112 involves identifying the presence of up and down going waves within the borehole. Step 114 involves calculating a prediction filter. Step 116 involves using the prediction filter to remove unwanted signals from the data signals.

I claim:

1. A method of exploring a subterranean formation ahead of a drill bit penetrating said formation, comprising the steps of:

(a) lowering a bottom hole assembly into a borehole filled with a fluid, said assembly comprising said drill bit, a sourse of acoustic energy and a plurality of receivers sensitive to acoustic energy;

(b) operating said drill bit to extend said borehole;

(c) while operating said drill bit using said acoustic source to emit acoustic energy into said fluid and said formation, thereby generating a primary compressional wave travelling within said fluid and secondary compressional waves travelling within said fluid, said secondary waves being converted into compressional waves at the bottom end of said borehole from acoustic energy reflected from within said formation;

(d) detecting said primary compressional wave;

(e) using information derived from said detected primary compressional wave to detect said secondary compressional waves; and (f) evaluating said detected secondary compressional waves to obtain features of said formation ahead of the drill bit.

2. The method of claim 1, wherein the compressional waves within the fluid are tube waves.

3. The method of claim 1, further comprising the steps of (g) estimating a velocity of the compressional waves within the fluid;

(h) using the detected primary compressional to refine said velocity estimate so as to produce a refined value of the velocity; and (i) using the refined value to detect small amplitude signals from waves within the fluid.

4. The method of claim 3, wherein the detected signals lag the primary wave arrival by the two-way travel time for a compressional wave to travel from a drill bit in the borehole to a reflector within the formation and to return to the bottom end of the borehole.

5. The method of claim 3, using beam-steering to isolate wave signals according to velocity and/or travel direction.

6. The method of claim 3, including conducting move-out analysis by combining the rate of penetration of a drill bit with a measured compressional wave velocity.

7. The method of claim 1, wherein the drill bit is used as the source of acoustic energy.

8. The method of claim 1, wherein the detected signals have a speed within the borehole of less than 2000 m/s.

9. The method of claim 1, further comprising identifying the presence of up and down going waves within the borehole, calculating a prediction filter, using the prediction filter to remove unwanted signals from the data signals.

10. An apparatus for exploring a subterranean formation ahead of a drill bit penetrating said formation, comprising (a) a source of acoustic energy to emit acoustic energy while drilling;

(b) receivers to detect compressional waves propagating through a fluid within said borehole while drilling; and (c) a signal processing filter using information derived from a primary compressional wave propagating through said fluid to identify secondary compressional waves propagating through said fluid, said secondary compressional waves being characteristic of the formation ahead of the drill bit.

11. The apparatus of claim 10, further comprising identification means to identify the presence of up and down going waves within the borehole, calculation means to calculate a prediction filter and to use the prediction filter to remove unwanted signals from detected signals.

12. The apparatus of claim 10, further comprising a beam-forming filter for suppressing signals according to velocity and/or direction.

13. The apparatus of claim 10, wherein the receivers are a plurality of pressure sensors each of which being designed to average a received signal over the circumference of the borehole.

14. The apparatus of claim 13, wherein the distance between two adjacent pressure sensors varies.

15. The apparatus of claim 10, wherein the source is the drill bit.

16. The apparatus of claim 10, wherein the source is the drill bit in combination with actuating means.

17. The apparatus of claim 10, further comprising means for transmitting signals to the surface.

18. Coiled drillstring having attached thereto an apparatus in accordance with claim 10.

* * * * *